(No Model.)
C. L. & J. P. AMES.
BALING PRESS.
No. 392,657. Patented Nov. 13, 1888.
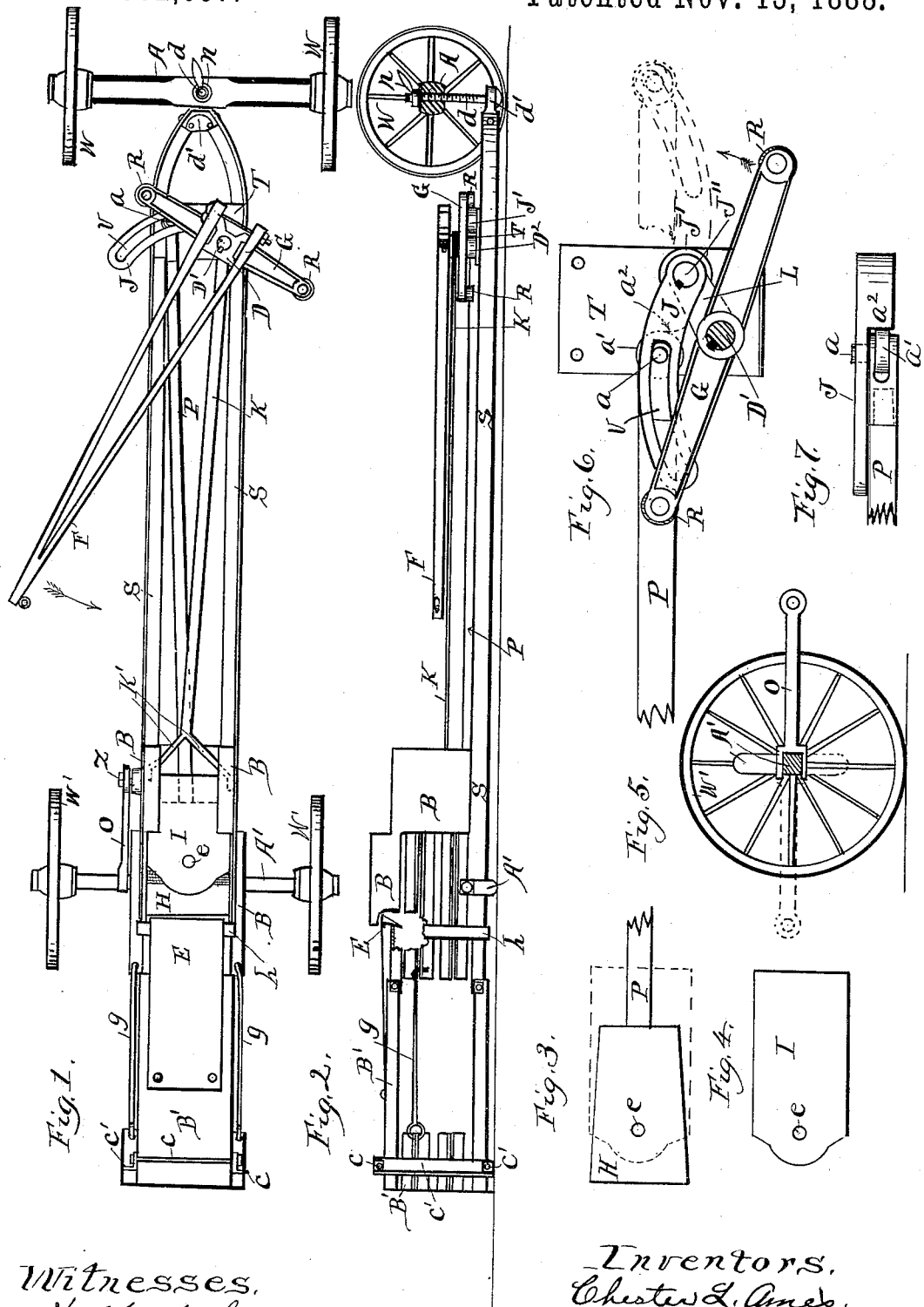
Witnesses.
Wm J. Hutchins.
K. C. Hutchins.
Inventors.
Chester L. Ames.
James P. Ames.
By Thos. H. Hutchins, Atty.

UNITED STATES PATENT OFFICE.

CHESTER L. AMES AND JAMES P. AMES, OF CABERY, ILLINOIS.

BALING-PRESS.

SPECIFICATION forming part of Letters Patent No. 392,657, dated November 13, 1888.

Application filed March 22, 1888. Serial No. 268,082. (No model.)

*To all whom it may concern:*

Be it known that we, CHESTER L. AMES and JAMES P. AMES, both citizens of the United States of America, residing at Cabery, in the county of Ford and State of Illinois, have invented certain new and useful Improvements in Baling-Presses, of which the following is a specification, reference being had therein to the accompanying drawings.

This invention relates to certain improvements in procumbent baling-presses for baling hay or other fibrous material, which improvements are fully set forth in the following specification and claims, reference being had to the accompanying drawings, and the letters and figures of reference thereon, making a part of this specification, in which—

Figure 1 is a top plan view. Fig. 2 is a side elevation, the rear wheels and one of the forward wheels being removed. Fig. 3 is a detail top plan view of the traverser and a portion of the pitman for reciprocating it. Fig. 4 is a plan view of a shield for covering the traverser. Fig. 5 is a cross-sectional view of the cranked rear axle and a side view of one of its wheels and of a lever for rotating said axle, the broken lines showing the reverse position of the axle after being rotated. Fig. 6 is a detail top plan view of the outer end of the pitman and the parts connected therewith and by which it is operated, and Fig. 7 is a detail side view of the outer end of the pitman and the slotted arm by which it is operated.

Referring to the drawings, S S represent the bed-sills of the machine, preferably made of angle-iron, curved at their forward ends to meet and be connected by means of the plate $d'$, having an eye through which a screw-threaded king-bolt, $d$, passes, and also up through the front axle, A, for adjustably supporting the forward end of the machine. The rear ends of said sills, bearing the bale-chamber and parts connected therewith, rest upon and are boxed to the cranked rear axle, A', of the machine, the cranked portion being the central part of the axle and of sufficient width to admit the body of the machine within the cranked portion. The said axle A' is intended to be rotated half-way around by means of the lever O, secured to it between the cranked portion and one of its wheels at the side of the bale-press for vertically adjusting the rear end of the machine, the said lever being provided with a pin-hole at its outer end and a pin, Z, for holding it and the crank of the axle A' in proper position to hold elevated or lowered the rear end of the machine. W and W' are the traveling-wheels of the machine arranged, respectively, in said axles. T is a plate arranged on the said bed-sills near their forward end and connecting them by being firmly bolted or riveted thereto, and is provided on the upper side with the socketed studs $D^2$ and J', the stud $D^2$ being arranged at one side of and in the rear of stud J', which is arranged a little to one side of the center between said sills.

J is a curved arm secured at one end to a short shaft, J'', arranged in the socket of stud J', and is provided with the slot V in the outer part.

G is a cross-head of the sweep F, and is secured to a short shaft, D', arranged in the socket of stud $D^2$.

D is a head-block secured on said shaft above cross-head G, and has secured to it the sweep F, as shown. Said cross-head is arranged on a plane above arm J, and is provided at each end on its under side with a friction-roller, R, for alternately engaging said arm on its outer side to carry it forward as said cross-head revolves.

P is a pitman rigidly secured at one end to the traverser H and provided at its opposite end with a friction-roller, $a'$, the axle of which extends upward through slot V of said arm J for connecting said pitman and arm. Said arm is provided on its under side with a depending shoulder, $a^2$, near the inner end of said slot for engaging the friction-roller $a'$ at the time when said arm has been turned toward the bale-chamber a sufficient distance to cause the end of the pitman to be brought to the inner end of said slot when the pressure on the pitman is greatest.

L is a link-brace connecting said two studs, and K is a tie-brace arranged on shaft D' at one end and secured at its opposite end to the forward end of the bale-chamber for supporting said shaft and its socket-stud $D^2$.

B is the bale-chamber, having sides made of angle-iron bars having slots or spaces between them for retainers (not necessary to be shown)

and to lessen friction of the bale, and is surrounded by a band, $h$, for supporting its side bars.

The traverser H is attached rigidly to the pitman P, and consequently moves laterally with the pitman, which is permitted by tapering it toward its end secured to the pitman, as shown particularly in Fig. 3. The traverser is provided on its upper side with a shield, made preferably of a thin metal plate pivotally secured to the traverser at $e$, but above said traverser, so the traverser may have lateral movement at its end connected with the pitman. This shield extends a little distance over the pitman and fills the space between the side walls of the bale-chamber, and permits lateral movement of the traverser, and prevents hay or other material from falling down between the sides of the traverser and the walls of the bale-chamber. The bale-chamber has the ordinary feed-opening in its upper side.

B' is a detachable bale-tension chamber for receiving the bale after it is formed in the bale-chamber B, and for bringing tension to bear on the bale, causing it to operate as a head for a succeeding bale to form against. This bale-chamber B' is detachably secured to the rear end of the bale-chamber B by means of bolts connecting their upper and lower sills and by means of the side hooks, $g$ $g$. The sides of said bale-tension chamber are open, except at the outer end, where short side bars are used and held in proper position by means of the vertically-arranged side bars, C, connected both at their upper and lower ends by means of the tension bolts or rods C', having nuts and screw-threads, by means of which tension bolts or rods the said tension chamber may be made narrower at its rear end than bale-chamber B for the purpose of giving tension to the bale for the purpose stated. The tension-chamber B' is provided on its upper side with the spring-retainer E, having its free end extending over the rear part of the feed-aperture of the bale-chamber B, and is turned down at that end in the form of a backwardly-inclined hook to prevent backward movement of the bale after it is relieved from pressure of the traverser and for holding down loose material that may be left from the top of the traverser after it has moved backward. This tension-chamber is made detachable, so it may be removed when it is desired to transport the machine, rendering it less bulky and unwieldy, and also so its tension on the bale can be more easily regulated than if the bale-chamber itself were provided with such means. When one of the rollers R of the cross-head first engages the arm J, it comes in contact with it about opposite the inner end of its said slot and gradually rolls outward along the back of said arm until it finally rolls off its outer end, which is caused by the eccentric position in which the cross-head is set with reference to said arm. As the roller R rolls along on said arm it gains leverage on the pitman, which loses its resistance by being brought in until it finally reaches the inner end of said slot, so that, notwithstanding the gradually-increased resistance of the bale, the leverage on the pitman is equalized, so that about the same power is required at all times to rotate the sweep and reciprocate the traverser.

In operation the machine is first let down near the ground by turning the nut $n$ of king-bolt $d$ backward and by reversing the crank of axle A', as shown in broken lines in Fig. 5, so the machine will be in position, as shown in Fig. 2, (the rear wheels not being shown in said figure, but designed to stand in a pit or be removed.) A team is attached to the outer end of the sweep F and travels continuously in one direction, crossing over the sills S near the bale-chamber, a suitable bridge having been placed over them. As the sweep F, with its cross-head G, rotates, one of its rollers R will engage the arm J on the outer side and carry it and the pitman forward from their position shown in the broken lines in Fig. 6 to that shown in the full lines in said figure and until the said roller rolls off and becomes disengaged from said arm, when the elasticity of the bale in the bale-chamber will force the pitman and said arm back to their original position, (shown in the broken lines in said figure,) ready for said arm to be likewise engaged and carried forward with the pitman by the opposite roller R of the cross-head, so that by this means the pitman is continuously reciprocated, while the sweep and said cross-head rotate continuously in the same direction. When the arm J is released from contact with the cross-head, the pitman will move very quickly backward to the outer end of the slot V in said arm, and its roller $a'$ will engage the inner side of one of the sills S as a guide during such operation and prevent too great lateral movement of that end of the pitman. When the cross-head first engages said arm, it is at a time when the charge of material in the bale-chamber has first been placed in, and as it is loose it makes little resistance. When said arm has been turned far enough forward, so the axle $a$ has traversed the slot V of said arm and reached the inner end of said slot, which is caused by the curved form of said slot and the sill S, acting as a guide to move said axle and pitman in that direction, the roller $a'$ on the end of the pitman is engaged by the shoulder $a^2$, and the axle $a$ in said slot is relieved from pressure, which is necessary, as at that time the resistance of the material being baled is greater and the said axle would not be strong enough to compress the bale. By this mechanism the traverser and pitman are reciprocated continuously, while the sweep and its cross-head turn continuously in one direction. It is designed to construct the entire machine of metal, so far as it is practicable to render it light, strong, and cheap.

We are aware it is not new to use a sweep that turns continuously in one direction, and hence do not claim that particular feature as new. If desired, the axle $a$ of the friction-roller $a'$ may be provided with a friction-roller at that part where it operates in said slot in order to prevent friction, and so when worn a new roller could be substituted to take up lost motion between said axle and the arm J.

Having thus described our invention, what we claim as new, and desire to secure by Letters Patent, is as follows, to wit:

1. In the baling-press shown and described, in combination with its sills S S and bale-chamber B, the plate T, having the socketed studs $D^2$ J', curved arm J, having the slot V and shoulder $a^2$, cross-head G, having the friction-rollers R R, sweep F, pitman P, having the friction-roller $a'$ and axle $a$, and traverser H, substantially as and for the purpose set forth.

2. In the baling-press shown and described, in combination with the sills S S and plate T, having the studs $D^2$ J', the curved arm J, having the slot V and shoulder $a^2$, cross-head G, having the rollers R R, and pitman P, having the friction-roller $a'$ and axle $a$, substantially as and for the purpose set forth.

3. In a baling-press, in combination with its baling-chamber, a traverser tapered laterally, so its rear end is narrower than its forward end, and a shield arranged to cover said traverser, substantially as and for the purpose set forth.

4. In the baling-press shown and described, in combination with the sills S S and bale-chamber B, having a feed-aperture in its upper part, the traverser H, having its rear part narrower than its forward part, the shield I, pivotally secured to the upper side of said traverser, and the pitman P, rigidly secured to the rear narrow end of said traverser, substantially as and for the purpose set forth.

5. In the baling-press shown and described, in combination with its sills S S and bale-chamber B, the plate T, having the studs $D^2$ J', the curved arm J, having the slot V and shoulder $a^2$, the sweep F, the cross-head G, having the friction-rollers R R, the pitman P, having the friction-roller $a'$ and axle $a$, the tapered traverser H, rigidly secured at its tapered end to said pitman, and the shield I, pivotally secured to the upper side of said traverser, substantially as and for the purpose set forth.

6. In the baling-press shown and described, and in combination with its sills S S, having the eye-plate $d'$, the crank-axle A', lever O, axle A, screw-bolt $d$, having nut $n$, and the truck-wheels W W', substantially as and for the purpose set forth.

CHESTER L. AMES.
JAMES P. AMES.

Witnesses:
L. D. GIFFORD,
W. N. BROWN.